United States Patent Office 3,574,659
Patented Apr. 13, 1971

3,574,659
PROCESS OF TEXTURED RESINOUS
SHEET PREPARATION
Harold Kwart, Newark, Leon B. Palmer, Little Falls, and
Robert P. Conger, Park Ridge, N.J., assignors to
Congoleum Industries, Inc., Kearny, N.J.
Filed Mar. 28, 1969, Ser. No. 811,524
Int. Cl. B44d 1/14; B32b 3/30
U.S. Cl. 117—11
24 Claims

ABSTRACT OF THE DISCLOSURE

A process for producing a resinous composition having a textured or embossed surface which comprises selectively contacting a resinous polymer containing a hydrazine derivative dispersed therein with an oxidizing agent for said hydrazine derivative, thereby resulting in the in-situ formation of a gas generating blowing system. The embossed products resulting from this process.

BACKGROUND OF THE INVENTION

Figure 1:
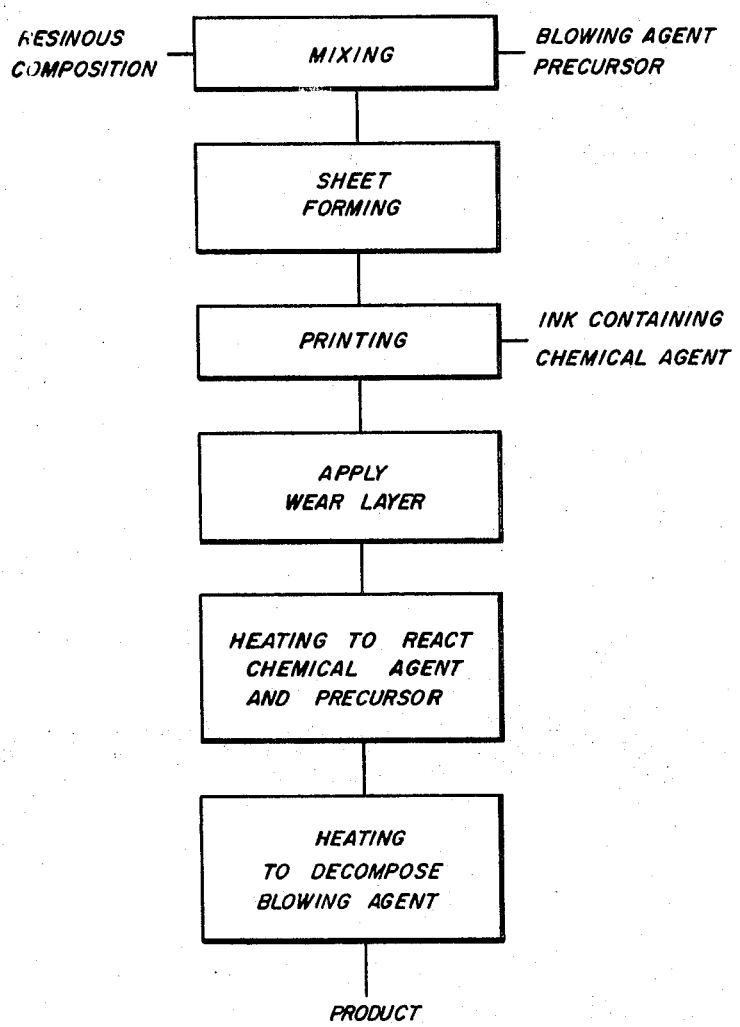

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability. It is common practice to emboss the surface of such sheets to give added decorative appeal and, in many instances, further utility. Typical of the types of embossings are those which simulate leather or textured cloth, such as linen. In some instances, the embossed areas are filled in with pigmented ink by techniques known as "spanishing" or "valley printing." Designs have also been printed on the surface of resinous composition sheets and, in many instances, the designs have been protected by the application of a transparent or translucent overcoating.

The introduction of cellular resinous compositions has led to their incorporation in products such as recited above, either alone, or in combination with non-cellular resinous composition surface wear layers and/or backing webs. The cellular foam sheet gives the product various desirable properties, depending on the type of cellular foam, such as high resiliency and good feel or "hand."

Embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet.

Another embossing procedure applicable to foamable compositions, is disclosed in U.S. Pat. 2,943,949 which issued to Robert K. Petry on June 5, 1960. In this patent, a web which can remain as part of the finished product or be subsequently removed is embossed with a design, a resinous layer containing a blowing agent is applied to the surface of the embossed web to form a relatively smooth layer and then the foamable composition is heated to decompose the blowing agent and fuse the composition. Since a greater thickness of foamable composition is present in the areas over the depressions in the web, the surface of the sheet is raised at these points to give a reverse image of the embossings. This type of product can be given greater wear resistance by applying a non-cellular resinous composition in the foam of a preformed sheet or as a coating over the surface either prior to decomposing the blowing agent or subsequent to such decomposition.

Various methods have been suggested for producing cellular resinous composition in the form of a preformed surface without utilizing embossing rolls. Embossing rolls are expensive to produce and when combined with a valley printing operation are difficult to control. In some instances, it is desired to print a design and then emboss in register with the design. Such an operation requires very complex equipment. Additionally, embossing of curved or irregular surfaces is very difficult.

One method which eliminates embossing rolls is disclosed in U.S. Pat. 2,961,332 which issued to R. Frank Nairn on Nov. 22, 1960. In accordance with this patent, a layer of foamable resinous composition is formed on a base by printing a number of different resinous compositions each containing its own amount or type of blowing agent. The layer is then heated to decompose the blowing agent and fuse the composition. The product has an irregular or textured surface conforming to the amount or type of blowing agent in the various printed compositions. Another method is disclosed in U.S. Pat. 2,964,799 which issued to P. E. Roggi et al., on Dec. 20, 1960. According to this patent, a foamable resinous composition is formed into a self-supporting sheet of fused composition. Heat is then applied to the foamable composition sheet at various points to cause the blowing agent at those points to decompose and form a cellular structure. The raised areas in the finished sheet correspond to the points of heat application. U.S. Pat. 2,825,282 which issued to J. B. Gergen et al., on Mar. 4, 1958, discloses a related method for producing a letterpress makeready. In accordance with this latter patent, a foamable composition is formed into a sheet and then printed with inks containing radiant energy-absorbing pigments. On exposure of the sheet to radiant energy, the blowing agent in contact with the pigments receives more intense heat and, therefore, will decompose and form cellular foam without affecting the unprinted portions of the sheet. As is apparent, the heating must be very rapid and carefully controlled. All of these methods are difficult and expensive in adaptation to commercial operations. Additionally, the type of product which can be produced is severely limited by the nature of the particular process selected.

An embossing technique which has proven to be a vast improvement over the procedures of the prior art is disclosed in U.S. Pats. 3,293,094 and 3,293,108, which issued to R. Frank Nairn et al. on Dec. 20, 1966. In this procedure, the decomposition temperature of a chemical blowing agent dispersed in a resinous polymer composition is controlled by applying an inhibitor to the surface of the composition. The subsequent application of heat to the composition selectively decomposes the blowing agent, thereby resulting in the formation of either depressed or raised areas in the final product at the points of inhibitor application.

SUMMARY OF THE INVENTION

The primary object of the invention is to provide a simple process for producing a resinous composition product having a textured or embossed surface. Another object is to provide such a process which is readily adaptable to standard printing equipment. Another object of the invention is to provide an embossed product of novel construction. A further object of the invention is to provide a process which allows the production of resinous composition sheets having embossed areas in register with a printed design. A still further object is to provide an embossing process which is readily adaptable to curved and irregular surfaces. Other objects and the advantages of the invention will appear hereinafter.

We have now discovered that it is possible to produce a large range of resinous cellular foam products having embossed surfaces by means of the in-situ formation of a gas generating system. Thus, in accordance with this invention, the surface of a resinous polymer composition containing a hydrazine derivative therein is contacted, in a desired design, with an oxidizing agent for said hydrazine derivative, thereby resulting in the formation of a corresponding gas generating system at the areas of contact. Inasmuch as such systems have recognized blowing characteristics, the subsequent application of heat to the system results in the decomposition of the gas generating compounds and the eventual formation of raised sections at the areas on the surface where said in-situ oxidation has occurred.

It is to be noted that the novel process of this invention provides a radical departure from the chemical embossing techniques of the prior art. Thus, the general scheme of these prior art methods has been to (1) disperse the selected blowing agent throughout the resinous composition, (2) selectively apply, to the resulting foamable composition, materials which either accelerate or retard the degree and/or rate of the subsequent decomposition of the blowing agent, and (3) heat the system in order to form the expanded blown sheet, the embossed effect resulting from the differential expansion between the treated and untreated areas.

In contrast, our novel procedure provides for the in-situ formation of a blowing system, thereby enabling the practitioner to prevent premature decomposition of the blowing system as well as to exert greater control over the entire foaming operation. The embossed effect is, thereafter, obtained by the expansion which occurs in those areas where the blowing system has been formed.

Furthermore, there are numerous materials which might ordinarily be used as blowing agents were it not for their poor stability characteristics. The novel process of this invention, and especially the in-situ formation of the blowing agent, thus enables the practitioner to take advantage of the gas generating properties of such materials; for example, 1,2-dihydro - 3,6 - dihydroxy-1,2,4,5-tetrazine and oxalyl hydrazide.

It should also be recognized that color changes frequently accompany oxidation-reduction reactions. Such color changes add an additional dimension to the novel process of this invention inasmuch as they may, on occasion, be utilized to implement the appearance of the final product.

This discovery makes possible the production of a product having embossed surfaces which are in perfect register with a printed design. Additionally, the discovery makes possible the utilization of any type of printing apparatus as an embosser, thereby eliminating the need for expensive embossing rolls and related equipment. Further, it allows the embossing of a surface without exerting pressure on the surface and without regard to the shape of the surface. The number of products which can be produced by the process is unlimited. It can be used for producing floor, wall and ceiling coverings, drapery, upholstery and clothing materials, tents and the like, and, in fact, wherever resinous plastic sheets or compositions are utilized. It is readily adaptable to decorating any surface on which foamable compositions can be applied such as automobile interiors, boots, boxes and packing cartons, book covers, maps, road markers, glass and plastic containers, television, radio and appliance cases, refrigerator backings, and the like.

Figure 2:
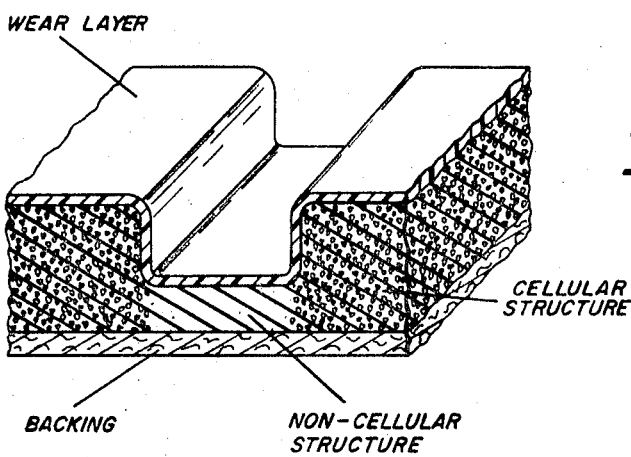

Our novel invention will be better understood from the following detailed description thereof together with the accompanying self-explanatory drawings, in which:

FIG. 1 is a flow diagram of a typical embodiment of the process of this invention, and FIG. 2 is an enlarged cross-sectional view of the final embossed product.

DESCRIPTION OF THE PREFERRED EMBODIMENT

With regard to the specifics of this invention, the backing web utilized will depend in large measure on the product to be produced. If the backing web is to remain as part of the finished product, then it can be formed of a resinous composition, felted sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos, glass and various synthetic fibers. Where loosely woven fabrics such as burlap are used, the fabric can be sized to prevent passage of the coating composition through the openings between the fibers by utilizing the conventional sizing composition used in the textile industry or a very viscous application of the coating composition which is to be applied. The coating can be dried or hardened quickly before it passes through the fabric.

Felted cellulose or mineral fibrous sheets are particularly useful in accordance with the invention for obtaining products usable as surface coverings since they are low in cost and yet are flexible and strong. The source of cellulose can include cotton or other rags, wood pulp, paper boxes, or mixtures thereof in any proportion. Asbestos is the most commonly used mineral fiber. Such sheets are usually prepared by subjecting an aqueous slurry of fibrous material to any of the techniques conventionally employed in the manufacture of paper. For example, sheet formation can take place on a Fourdrinier or cylinder sheet-forming machine. The fibrous sheet so prepared is then dried. In addition to cellulose and mineral fibers, other fibers can be used including fibers of synthetic and animal origin.

A felted fibrous sheet as produced by conventional sheet-forming techniques is usually unsatisfactory, if it is going to remain as part of the product, without the addition of a water-resistant and strengthening impregnant due to the poor strength and lack of water resistance exhibited by the unfortified material. The particular impregnant chosen must not only be capable of imparting strength and water resistance to the sheet, but must also meet other requirements as to its physical behavior at high temperatures. The coating compositions applied to the backing utilizing the preferred compositions of the invention must be heated to temperatures of from 300° F. to 400° F. in order to fuse the resin and/or expand the composition into a cellular foam. Thus, the impregnant chosen must be relatively stable at these temperatures. The impregnant also should be substantially free of any components which are volatile at these temperatures and it also must not soften to such an extent as to exude from the sheet. In addition, the impregnant should not be subject to appreciable detrimental chemical changes such as oxidation.

Suitable impregnants include vinyl resin, such as polymers of vinyl chloride and vinyl acetate. Particularly suitable are copolymers of vinyl acetate and vinyl chloride or these monomers copolymerized with other monomers copolymerizable therewith. In addition, polymerized acrylic and methacrylic acids, esters and their polymerized derivatives, polyethylene, polystyrene, butadiene-styrene copolymer, butadiene-acrylonitrile copolymer, polymerized chloroprene, and similar synthetic rubber-like polymers, natural rubber, and the like are suitable. Thermosetting resins which under the influence of heat cure by polymerizing and/or cross-linking with the cellulose can also be used as impregnants. Such resins as phenolic resins, polyesters, oleoresins such as cured drying and semi-drying oils and the like, isocyanates and polyurethanes and the like are also useful.

These resins can be incorporated into the felted fibrous sheet by impregnation of the sheet with an emulsion or solution of the resin followed by drying of the sheet to remove the solvent. Alternatively, the resin can be added in fine particles to the fiber furnish prior to sheet formation either as solid particles of resin or as an emulsion in water or other emulsifying vehicle.

It is sometimes desirable and particularly when the base is a felt sheet to apply a size coat prior to the application of the first coating. The size coat serves as a barrier coat to prevent migration of the felt impregnant into the coat. In addition, the size coat serves to provide good adhesion between the base sheet and the first coat. The size coat is preferably applied as an aqueous emulsion of a suitable resin although it can be applied as a plastisol or the like. Acrylic resins and vinyl chloride polymers have been found particularly useful for this purpose.

If the backing is to be removed from the final product, it is preferably a release paper. Such a paper conventionally has a coating on its surface to allow the plastic sheet to be easily stripped from the paper. Typical coatings used are clays, silicone compositions, polyvinyl alcohol, and similar special compositions well known in the art.

In accordance with the invention, a resinous polymer composition is applied to the base and, in some cases, a second layer of resinous polymer composition is utilized. The resinous binder is preferably one that is coalesced or fused into a continuous film by the application of heat since this allows gelling of the composition to produce a good printing surface. In this specification and claims, the term "fused" is intended to mean that state which is achieved in a resinous composition during the transition from a random dispersion or suspension of discrete resin particles in plasticizer to one of a homogeneous consistency and uniform viscosity and rheological characteristics.

The composition is also preferably a dispersion of resin in a liquid medium. The dispersion medium can be water in the case of an aqueous latex, organic solvent as an organosol or plasticizer as a plastisol. Best results have been obtained with a dispersion of resin in a plasticizer which is conventionally termed a plastisol. A plastisol has appreciable fluidity at normal room temperature, but is converted by heat into a fused, flexible tough thermoplastic mass. Plastisols are preferred since it is unnecessary to remove large volumes of carrier as is necessary with a latex or organosol. The composition can also be a mixture of dry blend and the hydrazine derivative. The dry blend is resin particles having plasticizer absorbed on their surface. The dry blend with the addition of stabilizer, pigments and the like can be mixed with the hydrazine derivative and distributed on a base in a smooth layer. The layer is then heated to either form a porous sheet or to fuse partially or completely the composition into a solid sheet. The oxidizing agent can then be applied to the sheet thus formed in any suitable manner. With the porous sheet modification, the penetration of the oxidizing agent is simplified because of the porous nature of the sheet. Such sheets are normally thereafter heated and subjected to a pressing operation to densify the sheet.

The preferred and most widely used resin for surface coverings are polymers of vinyl chloride. The vinyl chloride polymers can either be simple, unmixed homopolymers of vinyl chloride or copolymers, terpolymers, or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl bromide, vinyl fluoride, vinyl esters such as vinyl acetate, vinyl chloroacetate, vinyl butyrate, other fatty acid vinyl esters, vinyl alkyl sulfonates, and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. Although such vinyl chloride resins are preferred, as is apparent, the compositions can be formed from any resin which can be foamed with a gas generating system and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes; polyamides; polystyrene; phenolics; urea-formaldehydes; cellulose esters; epoxides; and silicones.

Resins adaptable for use in formulating vinyl plastisols are commonly referred to as dispersion grade resins. Such resins are available having particle sizes of from about 0.02 to about 2 microns in contarst to calender grade vinyl resins which are available in particle sizes ranging up to 200 microns. Dispersion grade resins are usually of higher molecular weight than calender grade resins and have particle surfaces of a hard, horny nature. Polymers of vinyl chloride having specific viscosities above about 0.25 and preferably between 0.30 and 0.70 as measured in a solution of 0.4 gram of resin in 100 milliliters of nitrobenzene at 30° C. are particularly effective (ASTM D1234–60). Specific viscosity is a comparison of the flow time for a control of pure nitrobenzene solvent as compared to the solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight.

In the formulation of plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Coating compositions for use in the invention preferably contain from about 20 to about 150 parts plasticizer per 100 parts resin with a range of about 50 to about 80 parts plasticizer per 100 parts resin being particularly effective. The viscosity of plastisol compositions can also be reduced by the addition of small amounts of a volatile diluent not exceeding about 10 parts per 100 parts resin; it being required that the diluent have no solvating effect on the resin. Useful diluents include benzene, toluene, petroleum solvents such as V.M. and P. naphtha (boiling range of 190–275° F.) and the like.

Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts of resin. The amount of solvent utilized depends in large measure on the coating viscosity best suited for the coating apparatus utilized.

The selection of the plasticizer is important in determining the strength and flexibility of the coating and also in influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, 2,2,4-trimethyl-1,3-pentanediol diisobutyrate, and the like. Plasticizers of the aromatic type, alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffin, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to use the resin. A vapor pressure of two millimeters of mercury or less at 400° F. has been found to be particularly satisfactory.

The coating compositions can contain pigments in accordance with the particular color desired. Any of the organic and inorganic pigments well known in the art for plastic compositions can be used. Normally, about 0.5 to 5 parts pigment per 100 parts resin are used.

Small amounts of stabilizers, well known in the art of making polyvinyl chloride compositions, are incorporated in the vinyl resin composition to minimize the effects of degradation by light and heat. Primary stabilizers ordinarily used are metallo-organic compounds, salts or complexes containing a metal component such as cadmium, zinc, lead, tin, barium or calcium combined with an anion constituent such as octoate, 2-ethylhexoate, naphthenate, tallate, benzoate, oxide, acetate, stearate, phenate, laurate, caprylate, phosphite, phthalate, maleate, fumarate, carbonate, sulfate, silicate, alkyl mercaptide, or mercaptoacid salts and esters. Mixtures containing one or more metals and/or one or more anion components are commonly employed. Depending upon the degree of heat and light stability required, secondary or auxiliary stabilizers such as epoxidized components, organic phosphites and phosphates, polyhydric alcohols, ultra violet light absorbers, optical brighteners, nitrogen compounds and antioxidants may also be incorporated in the resinous composition. Suitable primary stabilizers include: dibasic lead phthalate, dibasic lead phosphite, lead 2-ethylhexoate, basic and dibasic lead stearate, basic and dibasic lead acetate, lead naphthenate, tribasic lead maleate, tetrabasic lead fumarate, zinc oxide, zinc 2-ethylhexoate, zinc naphthenate, cadmium acetate, cadmium 2-ethylhexoate, cadmium oxide, cadmium laurate, cadmium naphthenate, barium 2-ethylhexoate, dibutyltin maleate, dibutyltin oxide, dibutyltin bis-(lauryl mercaptide), and proprietary metallo-organic compounds containing combinations of metal components such as zinc-barium-cadmium, zinc-barium, barium-cadmium, zinc-calcium, cadmium-zinc and the like. Suitable secondary stabilizers include: epoxidized soybean oil, octyl epoxy stearate, epoxidized esterified tallate; alkyl and aryl phosphites and phosphates such as diphenyl decyl phosphite, tribenzyl phosphite, trioctyl phosphite, octyl diphenyl phosphate and hexamethyl phosphorotrimide; benzotriazoles such as 2-(2-hydroxy-5'-methylphenyl) benzotriazole; o-hydroxy-benzophenones; salicylate esters; 2-cyano-3-phenyl cinnamate, derivatives of bis-(benzoxazolyl)-ethylene, 7-amino-3-phenylcoumarin and naphthotriazolylstilbene; pentaerythritol, melamine, dicyandiamide, 2,6-di-tert-butyl-p-cresol; and esters such as phenyl phthalate, phenyl benzoate, and o-tolyl benzoate.

It is common practice to use mixture of primary and secondary stabilizers to achieve the desired degree of stabilization. Normally the compositions contain about 0.1 to 10 parts stabilizer per 100 parts resin of which about 0.1 to 5 parts may be primary stabilizer and about 0.1 to 8 parts may be secondary stabilizer. The stabilizer can have the dual function of also serving as an accelerator or catalyst for the decomposition of the blowing agent.

The hydrazine derivatives which are applicable for use in the novel process of this invention are selected from the group consisting of

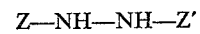

and cyclic analogs thereof,

and

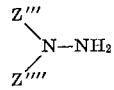

wherein Z and Z' are radicals independently selected from the group consisting of alkyl radicals; cycloalkyl radicals; phenyl radicals, substituted phenyl radicals;

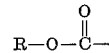

radicals wherein R is selected from the group consisting of hydrogen atoms and alkyl, cycloalkyl, phenyl and substituted phenyl radicals;

radicals wherein $R_1$ is selected from the group consisting of hydrogen atoms and alkyl, cycloalkyl, phenyl, substituted phenyl, amido and substituted amido radicals;

$(R_2)$—$SO_2$— radicals wherein $R_2$ is a radical selected from the group consisting of alkyl, phenyl and substituted phenyl radicals;

and

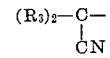

radicals wherein $R_3$ is an alkyl radical;

Z" is a radical selected from the group consisting of

radicals wherein $R_1$ is selected from the group consisting of hydrogen atoms and alkyl, cycloalkyl, phenyl, substituted phenyl, amido and substituted amido radicals;

$(R_2)$—$SO_2$— radicals wherein $R_2$ is selected from the group consisting of alkyl, phenyl and substituted phenyl radicals; and symmetrical analogs thereof; and Z''' and Z'''' are radicals independently selected from the group consisting of alkyl, cycloalkyl, phenyl and substituted phenyl radicals.

Representative hydrazine derivatives include:
1,2-disec-butyl hydrazodicarboxylate;
1,2-diisopropyl hydrazodicarboxylate;
1,2-diethyl hydrazodicarboxylate;
1,2-diethylene-bis-(ethyl hydrazodicarboxylate);
1,2-dicyclohexyl hydrazodicarboxylate;
1,2-dibenzoylhydrazine;
1,2-diformylhydrazine;
1-acetyl-2-phenylhydrazine;
hydrazodicarbonamide;
1-formyl-2-phenylhydrazine;
1,2-dihydro-3,6-dihydroxy-1,2,4,5-tetrazine;
succinic acid hydrazide;
1,2-di-tert-butyl hydrazine;
1,2-diisopropylhydrazine;
1,2-di-triphenylmethylhydrazine;
1-ethyl-2-phenylhydrazine;
s-bis-(benzenesulfonyl hydrazide);
s-bis-(methanesulfonyl hydrazide);
s-bis-(cyclohexanesulfonyl hydrazide);
s-bis-(p-toluenesulfonyl hydrazide);
hydrazo-bis-isobutyronitrile;
hydrazo-bis-cyclohexylnitrile;
hydrazo-bis-benzhydrylnitrile;
hydrazo-bis-alpha-methylbutyronitrile;
p,p'-oxy-bis-(benzenesulfonyl hydrazide);
oxalyl hydrazide;
p-toluenesulfonyl hydrazide;
benzhydrazide;
acethydrazide;
1-ethyl-1-phenylhydrazine;
1,1-dibenzylhydrazine; and
1,1-diisobutylhydrazine.

The oxidizing agents which can be effectively utilized to convert the hydrazine derivatives into their corresponding oxidation products, e.g.

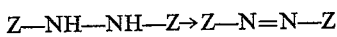

include: (1) positive halogen oxidizing agents, i.e. compounds containing electron deficient halogen atoms which enable them to function as oxidizing agents, such, for example, as 1,3-dichloro-5,5-dimethylhydantoin, diisocyanuryl chloride, dichloroisocyanuric acid, dichloroamine-T (sodium p-toluene sulfondichloroamide), dichloroamine-B (sodium benzenesulfondichloramine), N-bromosuccinimide, nitryl chloride, tert-butyl hyopchlorite, N-chlorophthalimide, ethyl-alpha-bromo-acetoacetate, ethyl bromomalonate; bromodihydroresorcinol and bromodimethyldihydroresorcinol; (2) peroxide compounds such, for example as meta-chloro perbenzoic acid, tert-butyl hydroperoxide, benzoyl peroxide, cumene hydroperoxide, di-amyl peroxide, dicumyl peroxide, di-tert-butyl peroxide, mono-permaleic acid and monoperphthalic acid; (3) quinone compounds such, for example, as chloranil, tetrachloro-1, 2-benzoquinone; and 2,3-dichloro-5,6-dicyano benzoquinone; (4) quinone chloroimides, i.e. compositions exhibiting both the quinone and positive halogen structures such, for example, as 2,6 - dibromoquinonechloroimide; (5) dialkyl sulfoxides such, for example, as dimethyl sulfoxide being especially effective in the presence of carbodiimides such as N,N'-dicyclohexyl carbodiimide; and (6) inorganic oxidants such, for example, as dinitrogen tetroxide, lead dioxide, and soluble tetravalent lead and thallium salts such as lead tetraacetate. As to the selection of an appropriate oxidizing agent, such choice will depend on the particular hydrazine derivative being utilized, the extent of foaming desired, the nature and properties of the resinous polymeric material being utilized and the nature of the carrier utilized for the oxidizing agent.

With regard to the concentration of hydrazine derivative present in the resinous polymeric material, the larger the amount used, the greater is the expansion of foam at the areas of contact with the oxidizing agent. Thus, for example, foam densities of from about 12 to 40 pounds per cubic foot may be obtained. Such results are attainable with from about 0.5 to 8.0 parts of hydrazine derivative per 100 parts, by weight, of resin solids.

For example, the degree of foaming of a typical plastisol formulation containing different concentrations of blowing agent is shown in the Table 1:

TABLE 1

| Parts azodicarbonamide per 100 parts resin: | Ratio of foam thickness to original thickness | Density, lbs./cu. ft. |
| --- | --- | --- |
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

The oxidizing agent is applied to one surface of the resinous polymer composition in any desired design. It is preferably applied in a liquid carrier which allows better control of the concentration of oxidizing agent applied. If the oxidizing agent is not soluble in the carrier, it can be dispersed with the carrier in the conventional paint-making technique to secure a fine dispersion. One of the easiest methods of applying the oxidizing agent-containing composition is by utilizing any of the conventional printing techniques such as silk screen, offset or direct rotogravure printing. As previously indicated, the oxidizing composition can be transparent or pigmented. It is conveniently formulated in the manner of a printing ink. Such compositions usually contain a binder for the pigment, such as a vinyl resin, and, in some cases, a plasticizer for the resin to give good adhesion to the printing surface. Unusual design effects can be obtained when the composition containing the hydrazine derivative is printed with a multicolored design wherein some of the ink compositions contain varying amounts of oxidizing agent and others do not contain any.

The amount of oxidizing agent utilized in the carrier will depend on the nature of the hydrazine derivative and the extent of foaming desired. Under ideal conditions, stoichiometric amounts of oxidizing agent, as related to the hydrazine derivatives, will be utilized. However, it is usually necessary to use a concentration of oxidizing agent in excess of the stoichiometric amount, and as much as an excess of 100%, in order to compensate for the oxidizing agent that is lost due to incomplete penetration, oxidation reactions with other components of the resinous composition and volatilization. In view of the wide range of molecular weights exhibited by the applicable hydrazine derivatives and oxidizing agents, the stoichiometric quantities of oxidizing agent which are utilized will exhibit a correspondingly wide range.

In accordance with a typical embodiment of the invention, a resinous polymer cellular foam sheet is produced having a textured or embossed surface by applying a layer of a resinous polymer composition containing a hydrazine derivative to a base material, heating the coating so as to at least partially gel the composition to yield a relatively solid surface, printing or otherwise selectively applying on the surface a composition containing an oxidizing agent which will convert the hydrazine derivative to a corresponding gas generating reaction product, applying a second resinous polymer composition which does not contain the hydrazine derivative over the printed surface and thereafter heating the composite structure to oxidize the hydrazine derivative, fuse the compositions and decompose the blowing system to form a cellular foam composition of the first layer. The finished product has a surface which is embossed. The surface of the product is completely covered by a solid layer formed by the second coat. This procedure provides a simple method for producing a foam product having a substantially thick wear-resistant surface layer and a textured surface. If the oxidizing composition is pigmented, then the embossed areas are accordingly pigmented. As is apparent, the oxidizing agent can be added to one or more printing inks which make up a design printed on the gelled, foamable composition.

It should be noted that the typical approach of adding the hydrazine derivative to the resinous composition and the oxidizing agent to the printing composition may be reversed where the peculiarities of any specific system so demand, and such modifications are deemed to fall within the scope of this invention.

For example, if an oxidizing agent is insoluble in the resinous composition and thereby limited in its ability to penetrate the resinous composition and engage in the oxidation reaction, it may be incorporated in the resinous corporation while the more soluble hydrazine derivative is added to the printing composition. The practitioner is thus able to overcome a potential difficulty and prepare an excellent textured product in accordance with this disclosure. Accordingly, it may be accepted as a general rule that the more soluble component between the hydrazine derivative and the oxidizing agent will be utilized as part of the printing composition, while the less soluble will be incorporated in the resinuos composition.

As an alternate method, the application of the wear layer can be omitted until after the decomposition of the blowing agent and the fusion of the cellular foam layer. The wear layer can then be applied by any suitable means, such as a spray coating, laminating a film, or the like. If desired, the solid wear layer can be omitted entirely.

In another alternate method, the oxidizing agent can be printed or otherwise applied to a supporting base and then the composition containing the hydrazine derivative applied over the oxidizing agent. The base, in this instance, can be, if desired, a transfer sheet and the design applied to form a decalcomania. Additionally, the foamable composition can be formed into a fused or partially fused sheet, such as by calendering, and then the oxidizing agent applied to either surface of the sheet.

Another method which can be utilized to good advantage is the printing or application of the oxidizing agent to the composition containing the hydrazine derivative while it is in a liquid state. Such a system also eliminates the need for a first heating step to gel the composition to make the system printable. One means of accomplishing this is by the application of the oxidizing agent to a base or release paper in the form of a design and then casting the liquid composition over the printed base. Another means is to apply the oxidizing agent directly on the liquid composition. This can be carried out, for example, by spraying, using stencils, or other means to control the areas of application of the oxidizing agent. Another means is by the use of electrostatic printing with a dry oxidizing composition which can be accomplished by the use of silk screens or the like which do not touch the liquid composition. Suitable apparatus for such electrostatic printing is disclosed in U.S. Pat. 3,081,698 issued Mar. 19, 1963 to C. O. Childress et al.

In order that the oxidizing agent be made available for the reaction with the hydrazine derivative which is distributed throughout the resinous sheet, the carrier for said oxidizing agent should be able to penetrate the resinous sheet. The oxidizing agent is thus carried into the sheet with maximum contact being established between the agent and the hydrazine derivative. The oxidation reaction will then occur as the temperature of the system is increased. Needless to say, the oxidation reaction will occur first in order to convert the non-gas generating hydrazine derivative into an effective gas generating material and, thereafter, continued heating will serve to decompose the resulting oxidation product. The gas which is thus liberated consists primarily of nitrogen gas although carbon monoxide, carbon dioxide, sulfur dioxide, water vapor and ammonia may also be present therein.

It should be noted that the mechanism of the reaction between the oxidizing agent and a mono- substituted hydrazine derivative, i.e., Z''—NH—NH$_2$, to produce a gas generating system differs from the reaction between the oxidizing agent and a disubstituted hydrazine derivative. Thus, in the former instance, gas is generated during the course of the oxidation reaction by means of the decomposition of an intermediate oxidation product, i.e.,

$$Z''\text{---}N\text{=}NH$$

This reaction, in contrast to the reaction with the disubstituted material, does not give rise to a stable, unsaturated reaction product which is then additionally heated to effect its decomposition. The advantages inherent in the novel process of this invention are maintained, however, regardless of the reaction mechanism which is followed.

It is common practice to add accelerators or catalysts to the compositions to accelerate the decomposition of the blowing systems, reduce the decomposition temperature and/or narrow the decomposition temperature range. Common accelerators are various metal salts such as dibasic lead phosphite, dibasic lead stearate, dibasic lead phthalate, basic lead acetate, lead stearate, lead acetate, tribasic lead maleate, tetrabasic lead fumarate, lead 2-ethylhexoate and similar lead salts, zinc laurate, zinc oxide, zinc stearate, zinc 2-ethylhexoate, zinc octoate, zinc naphthenate, and similar zinc salts, cadmium octoate, cadmium oxide, cadmium acetate, cadmium naphthenate, cadmium stearate, and similar cadmium salts, barium stearate, calcium stearate, dibutyl tin maleate, and dibutyl tin oxide. These agents can also normally serve as stabilizers for the composition. In the specification and claims, the term "blowing agent" is intended to include not only the blowing agent itself, but also the combination of a blowing agent with an accelerator.

The concentration and choice of accelerator will vary greatly according to the needs of the overall system. In general, the accelerator is present in a concentration of about 0.1 to 10 parts, by weight, per hundred parts of resin, and preferably from about 0.5 to 5 parts, by weight. Large concentrations are utilized when a substantial reduction in the decomposition temperature of the blowing system is required or when it is necessary to overcome a competing influence exerted by one of the other components. Thus, for example, since positive halogen oxidizing agents such as 1,3-dichloro-5,5-dimethylhydantoin, may inhibit the decomposition of the blowing agent, additional amounts of accelerator are required in order to overcome this competing reaction. On the other hand, where the oxidation reaction results in the preparation of unstable blowing agents, such as 1,2-dihydro-3,6-dihydroxy-1,2,4,5-tetrazine, accelerators are not required, although such materials may be present in the role of a stabilizer. Needless to say, accelerators are also not used where the blowing agents are normally unaffected by their presence.

As indicated, the invention has the advantage of eliminating the need for embossing rolls and pressure to produce a textured or embossed surface and thereby greatly reduces the cost. The time required to produce an embossing roll is substantially greater than a printing cylinder. In addition, errors in a printing cylinder are easier to correct than in an embossing cylinder. Also, embossing a resinous polymer cellular foam sheet with pressure always results in densifying the sheet. According to this invention, the cellular foam sheet is not densified and, therefore, a product having an excellent hand, feel or drape can be obtained. One of the most advantageous features of the invention is that the textured or embossed areas can be in perfect register with a printed design. It should be understood, however, that the oxidizing agent can also be applied at random rather than as an exact reproducible design.

Of particular importance is the fact that the in situ formation of the gas generating system provides the practitioner with exceptional control over the formation and decomposition thereof.

In addition, the initial absence of a gas generating system in the resinous composition provides the practitioner with great latitude as to the processing of such compositions prior to the oxidation reaction. Thus, the resinous materials may be subjected to calenderings, injection moldings, and extrusion techniques without concern as to the processing temperature and the possibility of premature gas evolution. Such freedom in selecting the initial processing conditions is of even greater importance when resinous materials which are not capable of existing in plastisol form, such as polystyrene, polyethylene and polypropylene, are sought to be utilized in the novel process of this invention.

An additional advantage of this invention is its adaptability to the preparation of embossed assemblies which exhibit transparent and semi-transparent areas on the surface thereof. Thus, since gas evolution is absent from those areas which are not contacted with the oxidizing agent, these areas will not exhibit the opaque characteristics which typically result from such gas generation. The ability to produce transparent areas enables the practitioner to create unique decorative effects in the embossed product.

The gas generating systems which result from the oxidation procedure must exhibit an effective amount of decomposition at a temperature below the decomposition temperature of the resin used. Furthermore, the preferred blowing systems are those that also decompose above the glass transition temperature (in the elastomeric region) of the resin composition. As an illustration, with the preferred vinyl chloride polymers, a blowing system decomposing between about 300° F. and about 420° F. can be used. In some instances, a combination of blowing systems can be used to advantage.

The foamable composition is heated to a temperature sufficient to fuse the resin by completely solvating the resin with plasticizer and to decompose the blowing system. The temperature of the entire mass of composition upon the backing must attain the fusion temperature of the resin in order to obtain a product of maximum strength. Using the preferred vinyl resin, fusion is attained at a temperature of about 300° F. to about 375° F. In addition, the entire mass must be heated to a point where the blowing system is decomposed. Since the nature of the final embossed product demands the retention of the gas that is generated in order to produce the cellular foam sections, the temperature to which the assembly is exposed and the duration of this exposure period must be selected so as to insure the latter result. Thus, the resinous material must exhibit a melt viscosity, at the selected temperature, which is sufficient to retain the evolved gas. Furthermore, heating must not be prolonged to the extent that the melt viscosity is sufficiently changed to allow the escape of the gas.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if a hydrocarbon solvent fraction (boiling point up to 350° F.) is used, heating at 200° F.–250° F. for five minutes will remove sufficient material so that fusion and blowing at 400° F. can be accomplished with good cell structure and freedom from blisters.

Heating in order to effect fusion and foaming can be brought about in a forced hot air oven; however, other types of heating can be used. For example, the product can be passed beneath radiant heating elements; alternately, dielectric heating can be used.

The foamed and fused product after leaving the heating oven is permitted to cool. Cooling is particularly important since any premature handling of the product immediately after foaming might cause partial collapse and distortion of the foam structure. Cooling can be brought about by mere exposure of the product to the atmosphere; thus the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition or by means of fine sprays of water upon the fused and foamed composition or by utilizing cooling rolls. After being cooled, the product is withdrawn from the processing apparatus.

As previously indicated, after the printing step or application of the oxidizing agent, a second layer of resinous composition can be applied. The second coating, as indicated above, can be the same or different composition from the first coating. If different compositions are used which are not readily compatible, an adhesive layer can be applied before the second coating. In the event that a decoration has been printed on the surface of the first coating, it is necessary for the second coating to be of transparent or translucent composition so that the printed design can be visible through the second coating. This second coating can serve as a wear layer and, therefore, its thickness will depend on how much wear is desired in the final product. As a general rule, a coating of from about 2 to about 25 mils is sufficient to give the product good wearing qualities. As previously indicated, the application of the second coating can be omitted altogether or it can be made after the foamable composition has been foamed and fused. In some instances, it may be desirable to produce the embossed effect prior to the application of the wear layer.

The resulting embossed products of this invention can be used in the form of a sheet as produced, or can be cut into tiles or other appropriate shapes depending on the particular use to which the product is to be put. Products produced in accordance with the invention have the characteristics of excellent resilience, depending in part on the thickness of the foam layer. They are also characterized by having a marked three-dimensional textured appearance in perfect register with a printed design, if desired. Still further, the products of the invention have good heat insulating properties by virtue of the sections of foamed composition and thus are warmer in winter than conventional resinous surface coverings.

The products of this invention can find use. They make excellent floor, wall and countertop coverings. Additionally, the products make excellent upholstery material, drapes and curtains enabling the production of a wide range of effects. Further, the process offers an excellent method of decorating objects such as bottles, cans, books, displays etc. Many additional applications will occur to those skilled in the art.

The following examples will further illustrate the embodiment of this invention.

Examples 1–31

These examples illustrate typical resinous compositions which are applicable for use in the novel process of this invention.

RESINOUS COMPOSITIONS

| | Examples | | | | | |
|---|---|---|---|---|---|---|
| | 1 | 2 | 3 | 4 | 5 | 6 |
| | Parts | | | | | |
| Polyvinyl chloride (specific viscosity 0.40) | 100 | 50 | 75 | 50 | 75 | 75 |
| Polyvinyl chloride (specific viscosity 0.60) | | 50 | | 25 | | |
| Polyvinyl chloride large particle size blending resin (specific vis. 0.40) | | | 25 | 25 | 25 | 25 |
| Butyl benzyl phthalate (plasticizer) | 78 | 44 | 58 | | 43.5 | 44 |
| Polydodecyl benzene (sec. plasticizer) | | | 15 | | 14.5 | 15 |
| Alkyl aryl hydrocarbon (sec. plasticizer) | | 10 | | 10 | | |
| Di(2-ethylhexyl) phthalate (plasticizer) | | | | 50 | | |
| Titanium dioxide | 5 | 5 | 5 | 5 | 5 | 5 |
| Naphtha (boiling range 310–400° F.) | 1.55 | 1.55 | 1.55 | 1.55 | 1.55 | 1.55 |
| Hydrazodicarbonamide | 2.35 | 2.35 | 4.7 | 2.35 | | |
| 1,2-dibenzoylhydrazine | | | | | 2.5 | |
| 1-acetyl-2-phenylhydrazine | | | | | | 2.5 |
| Dibasic lead stearate | | | | | 4.44 | |
| Dibasic lead phosphite | | | 4.08 | | | 2.0 |
| Basic lead acetate | 4.72 | 4.72 | | 4.72 | | |

| | Examples | | | | | |
|---|---|---|---|---|---|---|
| | 7 | 8 | 9 | 10 | 11 | 12 |
| | Parts | | | | | |
| Polyvinyl chloride (specific viscosity 0.40) | 75 | 75 | 75 | 75 | 50 | 100 |
| Polyvinyl chloride (specific viscosity 0.60) | | | | | 50 | |
| Polyvinyl chloride large particle size blending resin (specific vis. 0.40) | 25 | 25 | 25 | 25 | | |
| Butyl benzyl phthalate (plasticizer) | 58 | 58 | 58 | 58 | 58 | 60 |
| Titanium dioxide | 5 | 5 | 5 | 5 | 5 | 5 |
| Naphtha (boiling range 310–400° F.) | 1.55 | 1.55 | 1.55 | 1.55 | 1.55 | 1.55 |
| 1-formyl-2-phenylhydrazine | 2.5 | | | | | |
| 1,2-dihydro-3,6-dihydroxy-1,2,4,5-tetrazine | | 2.5 | | | | |
| 1,2-dicyclohexyl hydrazodicarboxylate | | | 2.5 | | | |
| 1,2-diisopropyl hydrazodicarboxylate | | | | 2.5 | 2.5 | |
| 1,2-diethylene-bis-(ethyl hydrazodicarboxylate) | | | | | | 2.5 |
| Lead oxide (PbO) | | | | 4.0 | | |
| Dibasic lead phthalate | | | 4.0 | | | |
| Zinc oxide | | 2.0 | | 2.0 | | |
| Dibasic lead stearate | | | | | 1.5 | |
| Zinc-2-ethylhexoate (18% Zn) | 2.0 | | | | | 2.0 |

| | Examples | | | | | |
|---|---|---|---|---|---|---|
| | 13 | 14 | 15 | 16 | 17 | 18 |
| | Parts | | | | | |
| Polyvinyl chloride (specific viscosity 0.40) | 75 | 75 | 75 | 50 | 75 | 75 |
| Polyvinyl chloride (specific viscosity 0.60) | | | | 50 | | |
| Polyvinyl chloride large particle size blending resin (specific vis. 0.40) | 25 | 25 | 25 | | 25 | 25 |
| Butyl benzyl phthalate (plasticizer) | 58 | 58 | 58 | 58 | 58 | 58 |
| Titanium dioxide | 5 | 5 | 5 | 5 | 5 | 5 |
| Naphtha (boiling range 310–400° F.) | 1.55 | 1.55 | 1.55 | 1.55 | 1.55 | 1.55 |
| 1,2-diisopropyl hydrazodicarboxylate | | | | | 2.5 | |
| 1,2-diethyl hydrazodicarboxylate | 2.5 | | | | | |
| 1,2-disec-butyl hydrazodicarboxylate | | 2.5 | 2.5 | | | |
| 1,2-di-tertiary butyl hydrazine | | | | 2.5 | | |
| 1,2-diisopropylhydrazine | | | | | | 2.5 |
| Lead oxide (PbO) | | | | | 2.0 | |
| Dibasic lead phthalate | | 2.0 | | | 2.0 | |
| Zinc oxide | | | 2.0 | | | |
| Dibasic lead phosphite | | | | 2.0 | | |
| Lead-2-ethylhexoate (24% Pb) | 3.0 | | | | | |
| Basic lead acetate | | | | | | 4.7 |

| | Examples | | | | | |
|---|---|---|---|---|---|---|
| | 19 | 20 | 21 | 22 | 23 | 24 |
| | Parts | | | | | |
| Polyvinyl chloride (specific viscosity 0.40) | 75 | 50 | 50 | 50 | 75 | 75 |
| Polyvinyl chloride (specific viscosity 0.60) | | 25 | 25 | 25 | | |
| Polyvinyl chloride large particle size blending resin (specific vis. 0.40) | 25 | 25 | 25 | 25 | 25 | 25 |
| Butyl benzyl phthalate (plasticizer) | 58 | 58 | 58 | 58 | 58 | 58 |
| Titanium dioxide | 5 | 5 | 5 | 5 | 5 | 5 |
| Naphtha (boiling range 310–400° F.) | 1.55 | 1.55 | 1.55 | 1.55 | 1.55 | 1.55 |
| 1,2-di-triphenylmethylhydrazine | 2.5 | | | | | |
| Sym.-bis-(benzenesulfonyl hydrazide) | | 2.5 | | | | |
| Sym.-bis-(methanesulfonyl hydrazide) | | | 2.5 | | | |
| Sym.-bis-(cyclohexanesulfonyl hydrazide) | | | | 2.5 | | |
| Hydrazo-bis-isobutyronitrile | | | | | 2.5 | |
| Hydrazo-bis-cyclohexylnitrile | | | | | | 2.5 |
| Zinc oxide | 2.0 | | | 2.0 | | 2.0 |
| Zinc-2-ethylhexoate (18% Zn) | | 2.0 | | | | |
| Basic lead acetate | | | 4.7 | | 4.7 | |

| | Examples | | | | | | |
|---|---|---|---|---|---|---|---|
| | 25 | 26 | 27 | 28 | 29 | 30 | 31 |
| | Parts | | | | | | |
| Polyvinyl chloride (specific viscosity 0.40) | 75 | 50 | 50 | 75 | | | |
| Polyvinyl chloride (specific viscosity 0.60) | | 25 | 25 | | | | |
| Polyvinyl chloride large particle size blending resin (specific vis. 0.40) | 25 | 25 | 25 | 25 | | | |
| Polystyrene (molding grade) | | | | | 100 | | |
| Polystyrene (high impact grade) | | | | | | 100 | |
| Polyethylene-MI 1.7 (low viscosity) | | | | | | | 100 |
| Butyl benzyl phthalate (plasticizer) | 58 | 58 | 58 | 58 | | | |
| Titanium dioxide | 5 | 5 | 5 | 5 | | | |
| Naphtha (boiling range 310–400° F.) | 1.55 | 1.55 | 1.55 | 1.55 | | | |
| 1,2-diformylhydrazine | | | | | 3.0 | | |
| p,p'-Oxy-bis-(benzenesulfonyl hydrazide) | 5.0 | | | | | | |
| p-Toluenesulfonyl hydrazide | | 5.0 | | | | | |
| Oxalyl hydrazide | | | 2.5 | | | 3.0 | |
| 1-ethyl-1-phenylhydrazine | | | | | | | 4.0 |
| 1,1-dibenzylhydrazine | | | | 2.5 | | | |
| 1,1-diisobutylhydrazine | | | | | 2.0 | 2.0 | |
| Zinc oxide | | | | | | | |
| Zinc-2-ethylhexoate (18% Zn) | 2.0 | | | | | | |
| Basic lead acetate | | | 4.7 | | | | |

Examples 32–49

These examples illustrate typical printing compositions which are applicable for use in the novel process of this invention.

PRINTING COMPOSITIONS

| | Examples | | | | | |
|---|---|---|---|---|---|---|
| | 32 | 33 | 34 | 35 | 36 | 37 |
| | Parts | | | | | |
| 90:10 vinyl chloride: vinyl acetate copolymer | 9.84 | 9.84 | 9.84 | 9.84 | 9.84 | 9.84 |
| Methylethyl ketone | 58.74 | 58.74 | 58.74 | 58.74 | 58.74 | 58.74 |
| Di(2-ethylhexyl) phthalate | 7.92 | 7.92 | 7.92 | 7.92 | 7.92 | 7.92 |
| Titanium dioxide | 11.0 | 11.0 | 11.0 | 11.0 | 11.0 | 11.0 |
| Diisocyanuryl chloride | 12.5 | | | | | |
| Cumene hydroperoxide | | 12.5 | | | | |
| 2,3-dichloro-5,6-dicyano benzoquinone | | | 12.5 | | | |
| 2,6-dibromoquinone chloroimide | | | | 12.5 | | |
| Dimethyl sulfoxide | | | | | 10.0 | |
| N,N'-dicyclohexyl carbodiimide | | | | | 2.5 | |
| Lead tetraacetate | | | | | | 12.5 |

|  | Examples | | | | | |
| --- | --- | --- | --- | --- | --- | --- |
|  | 38 | 39 | 40 | 41 | 42 | 43 |
|  | Parts | | | | | |
| 90:10 vinyl chloride:vinyl acetate copolymer | 9.84 | 9.98 | 9.84 | 9.84 | 10.26 | 10.00 |
| Methylethyl ketone | 58.74 | 59.97 | 58.74 | 58.74 | 79.74 | 77.68 |
| Di(2-ethylhexyl) phthalate | 7.92 | .37 | 7.92 | 7.92 |  |  |
| Titanium dioxide | 11.0 | 9.68 | 11.0 | 11.0 |  |  |
| Lead peroxide | 12.5 |  |  |  |  |  |
| N-Bromosuccinimide |  | 20 |  |  |  |  |
| 1,3-dichloro-5,5-dimethyl hydantoin |  |  | 12.5 |  |  |  |
| Mono-perphthalic acid |  |  |  | 12.5 |  |  |
| Dicumyl peroxide |  |  |  |  | 10.0 |  |
| Pinane hydroperoxide |  |  |  |  |  | 12.3 |

|  | Examples | | | | | |
| --- | --- | --- | --- | --- | --- | --- |
|  | 44 | 45 | 46 | 47 | 48 | 49 |
|  | Parts | | | | | |
| Dichloro isocyanuric acid | 15 |  |  |  |  |  |
| t-Butyl hydroperoxide |  | 10 |  |  |  | 20 |
| N-chlorophthalimide |  |  | 12.5 |  |  |  |
| Meta-chloro perbenzoic acid |  |  |  | 12.5 |  |  |
| di-Tert-butyl peroxide |  |  |  |  | 10.65 |  |
| 90:10 vinyl chloride:vinyl acetate copolymer | 9.69 | 10.26 | 9.84 | 9.84 | 11.56 |  |
| Methylethyl ketone | 75.31 | 79.74 | 58.74 | 58.74 | 68.07 | 78.5 |
| Di(2-ethylhexyl) phthalate |  |  | 7.92 | 7.92 | .36 |  |
| Titanium dioxide |  |  | 11.0 | 11.0 | 9.36 |  |
| Colloidal silica |  |  |  |  |  | 1.5 |

Example 50

This example illustrates the preparation of resinous compositions with embossed surfaces by means of the novel process of this invention.

The plastisol of Example 2, hereinabove, was applied as a uniform coating of about 0.010 inch on the surface of an asbestos sheet having a thickness of 0.040 inch. The asbestos sheet had previously been impregnated with about 30%, by weight, of synthetic rubber. The plastisol coating was then heated to a temperature of about 275° F. (oven temperature of 300° F.) for two minutes in order to gel the composition and the gelled composition was then cooled.

The printing composition of Example 40, hereinabove, was then applied in a desired design by a silk screen technique to the surface of the gelled composition at a wet application thickness of about 0.002 inch.

The following plastisol composition was then coated on the surface of the printed gelled composition to form a uniform clear coating of about 0.006 inch in thickness.

| | Parts |
| --- | --- |
| Polyvinyl chloride (specific viscosity 0.50) | 100 |
| Butyl benzyl phthalate | 34.2 |
| Polydodecyl benzene | 12.0 |
| 2,2-dimethyl-1,4-pentanediol isobutyrate | 7 |
| Epoxidized esterified tallate | 5 |
| Barium-zinc-phosphite (stabilizer) | 3 |
| Nonyl phenyl polyethylene glycol ether (surfactant) | 1.26 |
| Ethyl 2-cyano-3,3-diphenylacrylate (U.V. light absorber) | 0.38 |
| Carbazole dioxazine violet toner | 0.01 |

The resulting assembly was then heated to a temperature of about 375° F. (Oven temperature of 400° F.) in order to fuse the composition and decompose the blowing agent formed in-situ when the oxidizing agent penetrated the resinous composition and oxidized the hydrazine derivative contained therein.

The resulting product had a uniform cellular foam thickness of 0.020 inch at areas printed with the oxidizing agent, and a non-cellular structure of 0.010 inch thickness at the areas which were not printed with the oxidizing agent; the 0.006 inch thick wear layer being integrally bonded to the textured surface of the assembly. Accordingly, the resulting product thus had depressions in the surface corresponding to the areas not printed with the oxidizing agent of 0.010 inch in depth.

Example 51

The general procedure set forth in Example 50, hereinabove, was repeated with the exception that the combinations of resinous compositions and printing compositions listed in the following table were utilized to prepare comparable embossed resinous sheets.

| Resinous composition (Ex. #): | Printing composition (Ex. #) |
| --- | --- |
| 1 | 40 |
| 3 | 40 |
| 4 | 40 |
| 5 | 39 |
| 6 | 37 |
| 7 | 41 |
| 8 | 42 |
| 9 | 32 |
| 10 | 33 |
| 11 | 33 |
| 12 | 34 |
| 13 | 35 |
| 14 | 36 |
| 15 | 37 |
| 16 | 38 |
| 17 | 43 |
| 18 | 44 |
| 19 | 49 |
| 19 | 45 |
| 20 | 35 |
| 21 | 39 |
| 22 | 45 |
| 23 | 46 |
| 24 | 47 |
| 25 | 42 |
| 26 | 40 |
| 27 | 42 |
| 28 | 48 |

Example 52

The procedure set forth in Example 50 was repeated with the exception that the cooled gelled product was passed through a rotogravure press which printed a five-color design on the surface thereof. A portion of the printing composition that was applied thereto consisted of the formula of Example 40. The remaining portion of the printing composition did not contain any oxidizing agent. The plastisol composition described in Example 50, hereinabove, was then coated on the surface of the printed gelled composition by means of a reverse roll coater to form a uniform wear layer coating of 0.006 inch in thickness.

The sheet was then passed from the coater at a speed of 60 feet/minute into an oven having five zones each of 30 feet in length. The first four zones were heated to 350° F., 330° F., 400° F. and 410° F., respectively, while the last zone was kept unheated. During this heating operation, the hydrazide derivative was oxidized to a gas generating system, the resinous composition became fused and the blowing system decomposed to form foamed sections on the surface. The product was then cooled and wound on a collecting roll.

The resulting product had a textured surface caused by the raised areas of about 5 to 50 mils in height which corresponded to the areas printed with the ink containing the oxidizing agent. The product could be used directly as a floor covering. The solid transparent wear layer had excellent resistance to wear and staining and the design printed on the surface of the resinous composition was clearly visible through the transparent wear layer.

The following examples indicate the applicability to the novel process of this invention of resinous materials which are not capable of existing in plastisol form.

Example 53

A sheet of polystyrene containing 3 parts per hundred of 1,2-diformylhydrazine (M.P. 160° C.) (Example 29) was enclosed in a picture frame mold and printed in certain areas of its surface by means of a silk screen technique with nitrogen tetroxide (N₂O₄) in sym-tetrachloroethane (containing a small amount of polystyrene for viscosity control). The entire mass was then heated in a press under pressure to 130° C. for 5 minutes and then cooled to room temperature. The composition was allowed to stand at room temperature for a short period and then was heated in an oven at 120–130° C. in order to effect the oxidation reaction and cause expansion at the printed areas.

Example 54

High impact polystyrene was bonded on the mill and 4 parts per hundred of 1,1-dibenzyl-hydrazine (M.P. 60° C.) was admixed therewith. This material (Example 30) was calendered as a .020–.022 inch thick sheet which was then annealed for several minutes before cooling. The sheet was silk screen printed in certain areas of its surface with a pigmented ink containing t-butyl hypochlorite (B.P. 77° C.) in 1,1-dichloroethane (B.P. 57° C.) and a small amount of polystyrene for viscosity control and allowed to dry for a short period of time. The printed sheet was placed in an oven at 150° C. in order to effect the oxidation reaction and cause expansion at the printed areas.

Example 55

Low density polyethylene (MI 1.7) was fluxed on a two-roll mill at a roll temperature of 260–270° F. whereupon 3 parts per hundred of 1-ethyl-1-phenyl-hydrazine was slowly and thoroughly admixed therewith. The resulting mixture (Example 31) was calendered into a .020–.022 inch thick sheet. It was then pressure laminated warm to a release paper which has been previously hot silk screen printed with an ink containing cumene hydroperoxide, toluene and a small amount of low molecular weight polyethylene for viscosity control. The total composition was placed in a mold and heated in a press at 230° F. for 10 minutes to allow the cumene hydroperoxide to penetrate into the polyethylene and react with the 1-ethyl-1-phenylhydrazine. The pressure was released but the temperature was maintained at 230–240° F. until the desired expansion of the printed areas had occurred.

Summarizing, it is thus seen that this invention provides a novel process for preparing resinous sheets having a textured or embossed surface. Variations may be made in materials, proportions and procedures without departing from the scope of this invention which is defined by the following claims.

We claim:
1. A process for producing a resinous layer having a plurality of raised cellular areas on the surface thereof, said process comprising the steps of:
(1) incorporating, into a resinous material, a hydrazine derivative selected from the group consisting of

Z—NH—NH—Z and cyclic analogs thereof,

Z''—NH—NH₂ and

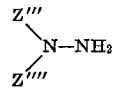

wherein Z and Z' are radicals independently selected from the group consisting of
alkyl radicals; cycloalkyl radicals; phenyl radicals and substituted phenyl radicals;

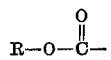

radicals wherein R is selected from the group consisting of hydrogen atoms and alkyl, cycloalkyl, phenyl and substituted phenyl radicals;

radicals wherein R₁ is selected from the group consisting of hydrogen atoms and alkyl, cycloalkyl, phenyl, substituted phenyl, amido and substituted amido radicals;
(R₂)—SO₂— radicals wherein R₂ is a radical selected from the group consisting of alkyl, phenyl and substituted phenyl radicals;
and $$(R_3)_2-\underset{\underset{CN}{|}}{C}-$$

radicals wherein R₃ is an alkyl radical;
Z'' is a radical selected from the group consisting of

radicals wherein R₁ is selected from the group consisting of hydrogen atoms and alkyl, cycloalkyl, phenyl, substituted phenyl, amido and substituted amido radicals;
(R₂)—SO₂— radicals wherein R₂ is selected from the group consisting of alkyl, phenyl and substituted phenyl radicals; and symmetrical analogs thereof; and
Z''' and Z'''' are radicals independently selected from the group consisting of alkyl, cycloalkyl, phenyl and substituted phenyl radicals;
(2) forming said resinous material into a desired shape;
(3) applying to portions of said resinous material an oxidizing agent for said hydrazine derivative which is capable of penetrating into said resinous material and oxidizing said hydrazine derivative; and,
(4) heating the resulting system to effect the oxidation of the hydrazine derivative and, thereafter, to decompose the resulting gas generating oxidation reaction product so as to cause expansion at the sites of decomposition and the formation of elevated cellular regions.

2. The process of claim 1, wherein said oxidizing agent is selected from the group consisting of positive halogen oxidizing agents, peroxide compounds, quinone compounds, quinone chloroimides, dialkyl sulfoxides and inorganic oxidizing agents.

3. The process of claim 2, wherein said oxidizing agent is at least partially soluble in at least one component of said resinous composition below the oxidation reaction temperature.

4. The process of claim 3, wherein said resinous material is heated in order to at least partially fuse the resinous composition prior to the application of said oxidizing agent.

5. The process of claim 3, wherein said oxidizing agent is applied to portions of a base and said resinous material containing said hydrazine derivative is applied over said oxidizing agent and base prior to said heating to effect the oxidation reaction.

6. The process of claim 1, wherein said resinous material is a polymer of vinyl chloride.

7. The process of claim 1, wherein said hydrazine derivative is a hydrazodicarbonamide and said gas generating oxidation reaction product is azodicarbonamide.

8. The process of claim 2, wherein said oxidizing agent is printed on said resinous material in the form of a design and a second layer of resinous material is applied over the printed oxidizing agent prior to said heating.

9. The process of claim 8, wherein said oxidizing agent is printed on said resinous material in the form of a design by a rotogravure printing process.

10. The process of claim 1, wherein said resinous material is formed into a self-supporting sheet of at least partially fused resinous material prior to the application of said oxidizing agent.

11. The process of claim 1, wherein one surface of the resinous material containing the hydrazine derivative is coated on to a web backing and the opposite surface of the resinous material is coated with a resinous material wear layer.

12. The process of claim 11, wherein said web backing is asbestos sheeting.

13. The process of claim 11, wherein said resinous material in said wear layer is a polymer of vinyl chloride.

14. The process of claim 1, wherein said hydrazine derivative is a mono-substituted hydrazine derivative.

15. The process of claim 14, wherein the product of the reaction between said mono-substituted hydrazine derivative and said oxidation agent is a non-stable, gas generating reaction product which, under the conditions of the oxidation reaction, decomposes simultaneously with its formation.

16. The process of claim 15, wherein said mono-substituted hydrazine derivative corresponds to the formula $(R_2)-SO_2-NH-NH_2$ wherein $R_2$ is a radical selected from the group consisting of alkyl, phenyl, and substituted phenyl radicals.

17. A process for producing a resinous layer having a plurality of raised cellular areas on the surface thereof, said process comprising the steps of: (1) incorporating hydrazodiacarbonamide into a resinous material; (2) forming said resinous material into a desired shape; (3) applying to portions of said resinous material a positive halogen oxidizing agent; and (4) heating the resulting system to effect the oxidation of the hydrazodicarbonamide, and thereafter, to decompose the resulting azodicarbonamide so as to cause expansion at the sites of decomposition and the formation of elevated cellular regions.

18. The process of claim 17, wherein said resinous material is a polymer of vinyl chloride.

19. The process of claim 17, wherein said positive halogen oxidizing agent is 1,3-dichloro-5,5-dimethylhydantoin.

20. The process of claim 17, wherein said resinous layer is coated on the surface containing said raised cellular areas with a resinous composition wear layer.

21. The process of claim 20, wherein said resinous composition in said wear layer is a polymer of vinyl chloride.

22. The process of claim 17, wherein said resinous layer is laminated to a web backing.

23. The process of claim 22, wherein said web backing is asbestos sheeting.

24. The process of claim 17, wherein said oxidizing agent is applied to said resinous material in a printing composition.

References Cited

UNITED STATES PATENTS

| | | | |
|---|---|---|---|
| 3,293,108 | 12/1966 | Nairn | 161—160 |
| 3,365,353 | 1/1968 | Witman | 161—160 |
| 3,373,072 | 3/1968 | Jones | 161—160 |
| 3,399,106 | 8/1968 | Palmer et al. | 161—160 |

WILLIAM J. VAN BALEN, Primary Examiner

U.S. Cl. X.R.

117—62.1; 161—124, 160, 161; 264—47